United States Patent Office 3,137,350
Patented June 16, 1964

3,137,350
POWER CULTIVATOR
John M. Horr, deceased, late of Tulare, Calif., by
Frances M. Horr, executrix, Tulare, Calif.
Filed July 2, 1963, Ser. No. 292,502
1 Claim. (Cl. 172—117)

This invention relates to agricultural implements, and particularly to a cultivator structure adapted to be mounted on a high-clearance wheeled farm tractor, and to be driven from such tractor.

One of the objects of this invention is to provide a plurality of separate transversely spaced cultivator sections arranged to be mounted on the transverse tool bar of the tractor so as to work under the body of the tractor in the soil between a number of rows of growing crops.

Another object of this invention is to provide power means to drive all of the blade units of the sections simultaneously from the power take-off shaft of the tractor, while allowing of individual up and down movement of the cultivator sections as the ground conditions encountered by the cultivating blades of the units may necessitate.

A further object of the invention is to provide power operated means for raising all of the cultivator sections clear of the ground simultaneously, without interfering with the up and down movement thereof when the blades are in a ground engaging position, as noted above.

A further object of the invention is to provide a practical, reliable, and durable power cultivator, and one which will be exceedingly effective for the purpose for which it is designed.

These objects are accomplished by means of such structure and relative arrangement of parts as will fully appear by a perusal of the following specification and claims.

Figure 1:
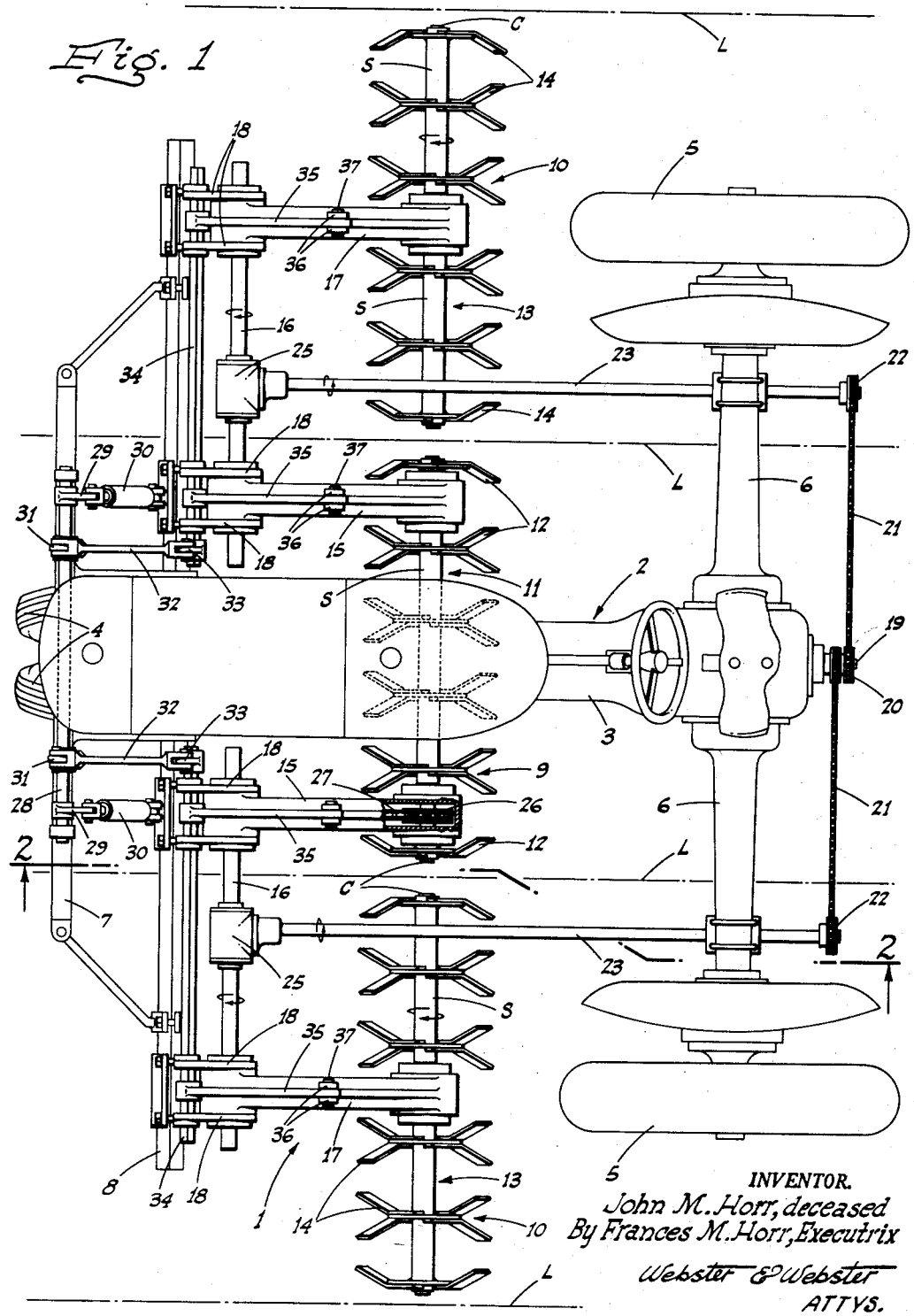
FIG. 1 is a top plan view of the improved power cultivator, as mounted on a conventional wheel type tractor.
Figure 2:
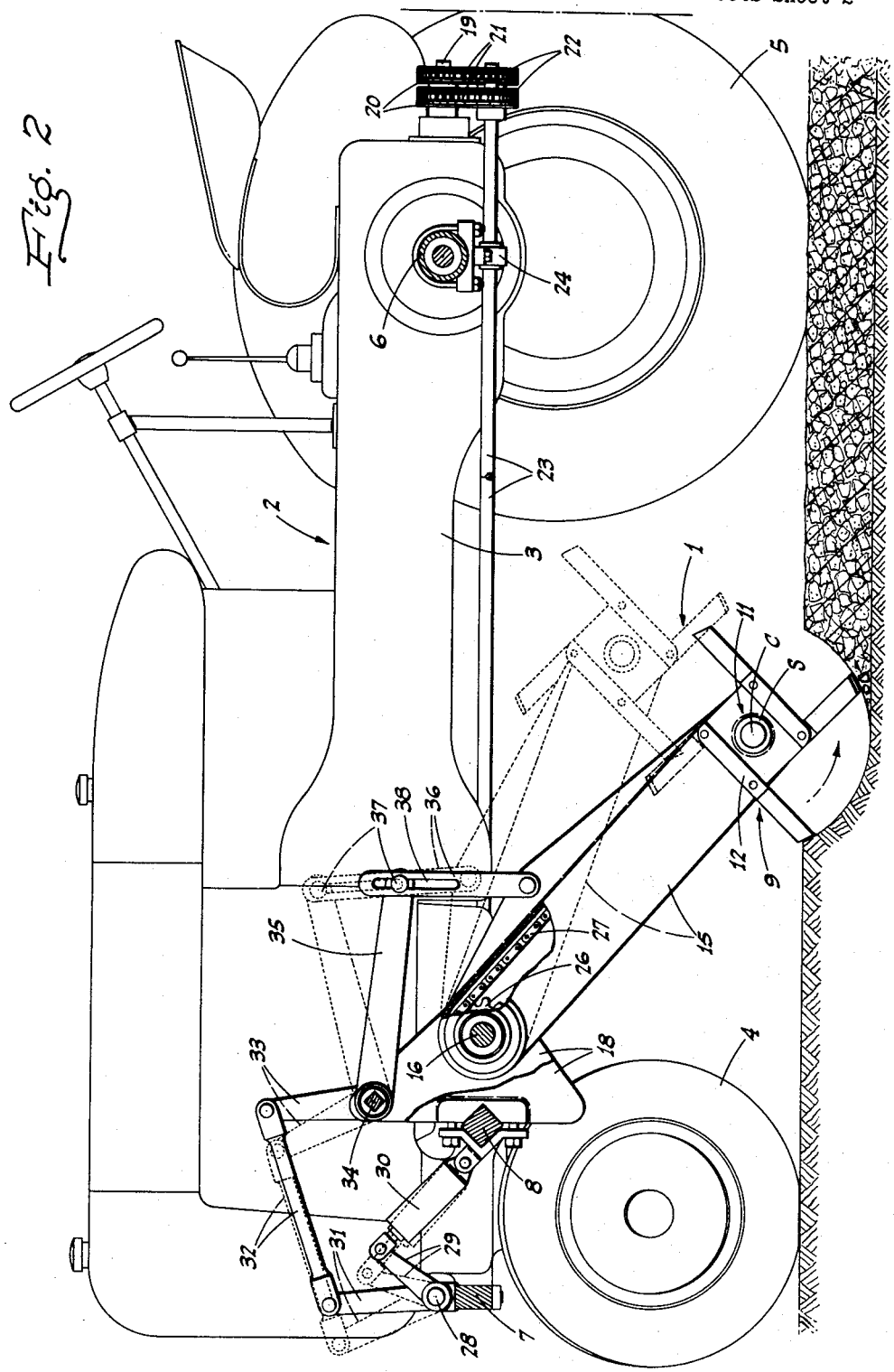
FIG. 2 is a sectional enlarged elevation of the implement and tractor, taken on line 2—2 of FIG. 1.

Referring now more particularly to the drawings, and to the characters of reference marked thereon, the power cultivator, indicated generally at 1, has been particularly designed to be mounted on a conventional high-clearance wheeled tractor, indicated generally at 2. This tractor includes a longitudinal body 3 supported at its forward end by closely spaced steerable wheels 4, and at its rear end by widely spaced driven wheels 5 which are mounted at the outer ends of axle housings 6 rigid with the body 3. The tractor 2 also includes a front-end transverse beam 7 and a longer transverse tool bar 8 a short distance rearwardly of beam 7; both beam 7 and tool bar 8 being of course clear of the wheels 4.

The power cultivator 1 comprises a central cultivator section, indicated generally at 9, and extending under the body 3 intermediate its ends, and side cultivator sections, indicated generally at 10, alined with but separate from section 9 and projecting laterally out some distance from the corresponding tractor wheels 5. The three cultivator sections 9 and 10 are all the same length, in a direction transversely of the tractor, and are arranged so as to cultivate the areas between adjacent rows of growing plants; such rows being indicated by the lines L in FIG. 1.

The sections 9 and 10 are identical in construction; the central section 9 comprising a rotary full-length shaft 11 on which is fixed a plurality of rotary blade units 12 of suitable form or design, and which are disposed in evenly spaced relation along the shaft 11. Similarly, each section 10 comprises a full-length rotary shaft 13, alined with the shaft 11, and a plurality of evenly spaced rotary blade units 14 fixed on said shaft 13.

The shaft 11 is journaled adjacent its ends, beyond the sides of the tractor body, in the rear ends of hollow, forwardly extending draft arms 15 which at their forward ends are turnably mounted on transverse shafts 16 extending in axially alined relation laterally out from the tractor body 3, as shown in FIG. 1. Similar hollow draft arms 17 turnably support the shafts 13 centrally of their ends from and are turnable on the shafts 16. Said shafts 16 are journaled, adjacent the draft arms 15 and 17, in bracket units 18 mounted on and projecting rearwardly from the tool bar 8. As will be clearly seen from FIG. 1, each bracket unit comprises a pair of upstanding bracket plates spaced apart sufficiently to receive the upper ends of the draft arms therebetween.

It is to be noted that—for the sake of simplicity of description—each shaft 11 or 13 has been considered as being a single element. Actually, however, from a practical manufacturing and replacement standpoint, each such shaft comprises a central core C which is the part journaled in the arms 15 or 17, and a sleeve S suitably detachably secured against rotation on the core clear of the journaled portions thereof and on which the rotary blade units 12 or 14 are mounted. This enables the cores C, when the sleeve portions are disconnected therefrom, to be pulled lengthwise from their bearings and the sleeves removed for replacement or repair of the rotary blade units thereon if necessary.

To drive the rotary cultivator blade units from the tractor, the following arrangement is provided:

Projecting from the rear end of the tractor body 3 is the usual driven power take-off shaft 19, on which is fixed a pair of sprocket wheels 20. Endless chains 21 or the like extend transversely in opposite directions from the sprockets and at their outer ends engage sprockets 22 on the rear ends of longitudinally extending shafts 23 disposed laterally out from the tractor body 3. These shafts project under and close to the axle housings 6, and adjacent their rear ends are journaled in bearings 24 mounted on said housings in depending relation. At their forward ends, the shafts 23 are supported and journaled in gear boxes 25 turnably mounted on the shafts 16; said boxes containing a common form of gear unit (not shown) by means of which the rotation of the shafts 23 is imparted to the shafts 16. Inside each of the draft arms 15 and 17 is a drive unit connecting the related shafts 16 and the related cultivator shaft 11 or 13, and which unit comprises sprockets 26 fixed on said shafts and an endless chain 27 extending between and engaging the sprockets.

The different rotary blade units 12 and 14 engage the ground in digging relationship by reason of the weight of the corresponding cultivator sections as a whole, while the individual mounting of such sections on the respective shafts 16 enables the sections—and which include the rotary blade units 12 and 14—to move up and down independently of each other, and without interfering with the driving of said rotary blade units.

All of the cultivator sections, however, may be raised simultaneously so that the rotary blade units 12 and 14 are withdrawn from the ground and held in a non-operating position, when desired, by the following means:

Journaled on the tractor beam 7 and extending under the body 3 and beyond the sides thereof is a transverse shaft 28. Arms 29 project upwardly and rearwardly from shaft 28 adjacent its ends, and are connected to the upper forward ends of hydraulic rams 30, the rear ends of which are supported from the tool bar 8. Other arms 31 are fixed on and upstand from the shaft 28 to the sides of the tractor body 3, and are connected by links 32 to other arms 33 which are substantially parallel to the arms 31. The arms 33 upstand from, and are fixed on separate transverse shafts 34 disposed on opposite sides of the tractor body 3 and which are journaled in the brackets 18 some distance above the shafts 16.

Rearwardly extending arms 35 are fixed on shafts 34 and extend over and directly above the various draft arms 15 and 17; links 36 depending from and being connected at their lower ends to said draft arms. The arms 35 at their rear ends carry laterally projecting pins 37 riding in longitudinal slots 38 in the links 36; the pins, when the rams 30 are fully contracted and the blade units 12 and 14 are in their operative ground engaging position, being adjacent the upper ends of the slots so as not to interfere with the upward yielding movement of the cultivator sections.

When the rams 30 are extended, the various draft arms 15 and 17 are raised, simultaneously and to the same extent, by reason of the movement of the arms 29 and 31; links 32; arms 33 and 35; and the links 36. It will also be noted that the working depth of the rotary blade units 12 and 14 may be altered to suit different conditions by a partial extension of the rams 30 sufficient to pull up on the links 36 and draft arms 15 and 17 a short distance only.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

A cultivator structure for a wheeled tractor having a transverse tool bar thereon adjacent the forward end thereof; said structure comprising a pair of bracket units mounted on the tool bar in spaced relation along the same and on one side of the tractor, a driven shaft parallel to the tool bar extending between the bracket units and journaled therein, a draft arm projecting downwardly and rearwardly from one bracket unit and turnably mounted on the shaft, such bracket unit comprising a pair of relatively closely spaced upstanding plates between which the upper end of said draft arm is disposed in contacting relationship and in which plates said shaft is journaled, a rotary cultivator section including a shaft journaled in and extending from said arm at its lower end, drive means between the shafts adjacent said one bracket unit, and means including a rotatable shaft journaled in and extending between the bracket units above the driven shaft and connected to the draft arm to raise and lower the same.

References Cited in the file of this patent

UNITED STATES PATENTS

| | | |
|---|---|---|
| 1,664,789 | Von Meyenburg | Apr. 3, 1928 |
| 2,182,157 | McDermott | Dec. 5, 1939 |
| 2,317,188 | Hanson | Apr. 20, 1943 |
| 2,319,255 | Norton | May 18, 1943 |
| 2,364,043 | Ariens | Dec. 5, 1944 |
| 2,366,386 | Clark | Jan. 2, 1945 |
| 2,616,348 | Ariens | Nov. 4, 1952 |
| 3,071,198 | Blocker | Jan. 1, 1963 |

FOREIGN PATENTS

| | | |
|---|---|---|
| 375,412 | Germany | May 11, 1923 |
| 420,050 | Great Britain | Nov. 23, 1934 |